United States Patent [19]

Fedors et al.

[11] 4,252,440

[45] Feb. 24, 1981

[54] PHOTOMECHANICAL TRANSDUCER

[76] Inventors: Robert A. Frosch, Administrator of the National Aeronautics and Space Administration, with respect to an invention of Robert F. Fedors, Altadena; Mohammad N. Sarbolouki, La Canada, both of Calif.

[21] Appl. No.: 969,760

[22] Filed: Dec. 15, 1978

[51] Int. Cl.³ .......................... G01J 1/56; G01J 1/00; G01J 1/40; G01B 11/16
[52] U.S. Cl. .................................. 356/216; 356/213; 356/234; 356/32
[58] Field of Search ................ 356/216, 213, 234, 32; 73/800, 16

[56] References Cited

U.S. PATENT DOCUMENTS

| | | | |
|---|---|---|---|
| 2,334,969 | 11/1943 | Thut | 356/216 |
| 3,106,086 | 10/1963 | Hughel | 73/16 |
| 3,295,358 | 1/1967 | Boenisch | 73/16 |

*Primary Examiner*—John K. Corbin
*Assistant Examiner*—Rodney B. Bovernick

[57] ABSTRACT

Light absorbing ultra-thin films mounted under a fixed strain exhibit the behavior of an optomechanicalor photomechanical transducer. The transducer responds to light in a quick and reversible manner converting a time-variable light source into a time-variable mechanical stress easily monitored by a device such as a strain gage.

13 Claims, 4 Drawing Figures

PHOTOMECHANICAL TRANSDUCER

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

The present invention relates to a photomechanical transducer in the form of a thin light-absorbing film useful for monitoring light intensity and total exposure and in other devices such as switches, light intensity regulators, or light driven motors.

2. Description of the Prior Art

Radiation monitoring devices are based on the use of recording films, recording plates, photocells or photodiodes. Though the cost of photosensitive solid state elements have recently been reduced, they are still marketed at a substantial cost due to the manufacturing processes requiring doping of high purity crystals. Furthermore, these devices all require electrical biasing and amplification for operation.

SUMMARY OF THE INVENTION

A simple, low cost non-electrical photomechanical transducer has been provided in accordance with this invention. The transducer is capable of determining total light exposure from a time-variable intensity light source. The transducer of this invention is extremely sensitive over wide range of wavelengths and intensities, capable of detecting low intensity illumination from a flash light and also from 110 volt lamps. When the illumination source is terminated the transducer immediately returns to its original condition. The optical transducers of the invention may be utilized wherever photocells or photodiodes are now used to monitor variations in light intensity while at the same time giving data on total exposure.

The phototransducer of the invention comprises an ultrathin strip of polymeric or metallic film or their combinations having an efficient absorptive surface. When the strip is held under small and constant strain in a stress-strain analyzer, the strip responds to light in a quick and reversible manner. The effect appears to be a function of the light intensity and wavelength as well as the film structure. It also appears from preliminary experiments that the phenomenon is due to thermal expansion or contraction in response to light absorption by the strip. Thus, many different measuring, switching and prime mover devices can be constructed based on this extremely simple and unique transducer. It is very surprising that the dimensional variation of these film strips in response to light has not previously been observed nor reported.

The ultra thin film transducer of this invention are low cost devices and can be utilized in any application requiring monitoring of a time varying radiation. The transducers can be fabricated to have spectral sensitivity in the same ranges as presently utilized photoelectric cells, photodiodes and infrared scanners. Specific examples: (1) Low cost photodetectors for measuring light intensity, for subtracking and for security purposes; (2) photoswitches; (3) photostats that can function like thermostats, in regulating the light intensity; (4) photo- and thermo-phones; based on transforming time varying light or thermal radiation into a corresponding dimensional variation which is then coupled to a polymeric or non-polymeric piezoelectric transducers, like polyvinylidene fluoride, etc.; (5) rotary motion based on coupled extension-contraction in a multi element device. The transducers of this invention unlike currently available photo-devices do not require vacuum operation. Investigatory and analytical tools for measuring and monitoring material properties can also be imagined, like: thermal expansion coefficient, Young modulus, specific heat, thermal diffusivity, and light absorbtivity.

These and many other features and attendant advantages of the invention will become apparent as the invention becomes better understood by reference to the following detailed description when considered in conjunction with the accompanying drawings.

DESCRIPTION OF THE PREFERRED EMBODIMENTS

The strip should have a thickness of not more than 75 $\mu$m (3 mil), preferably no more than 25 $\mu$m (1 mil) so as to avoid thermal gradients through the film. The minimum thickness of the film is only constrained by the ability to form a continuous, uniform integral film and can be as low as 0.025 $\mu$m (0.001 mil) or less. The width and length of the film are not critical since it is the surface area of the strip exposed to illumination that controls the extent of the transduction. However, significant response can be measured in areas as small as 0.01 cm$^2$ and practical devices can function reliably with areas as small as 1 cm$^2$. The width of the film is typically from 1 to 5 cm. The length is sufficient to bridge the clamps of the fixed and moveable supports of the device and excess length can be masked from the illumination source.

The ultrathin film is formed of a metal or a polymeric material or their combination and can be a high modulus or low modulus material and can be a natural or synthetic plastic. It should have a low creep rate. For example, the plastic should have a high glass transition temperature and have high temperature inertness if used in place of a pyrometer to measure the temperature in a furnace. The plastic must be capable of being compounded with radiation absorbing pigments such as carbon black or be capable of being coated with a radiation absorbing layer such as chromium or indium tin oxide, etc. Best film candidates for the photomechanical transducer have high absorbtivity (k), high elastic modulus (E) and high thermal expansion coefficient ($\alpha$) and low heat capacity.

Preferred film materials are linear synthetic organic plastics such as aromatic polyimides, polyesters such as polyethyleneterephthalate, polyolefins such as polyethylene, polyamides or polycarbonates.

Figure 4:
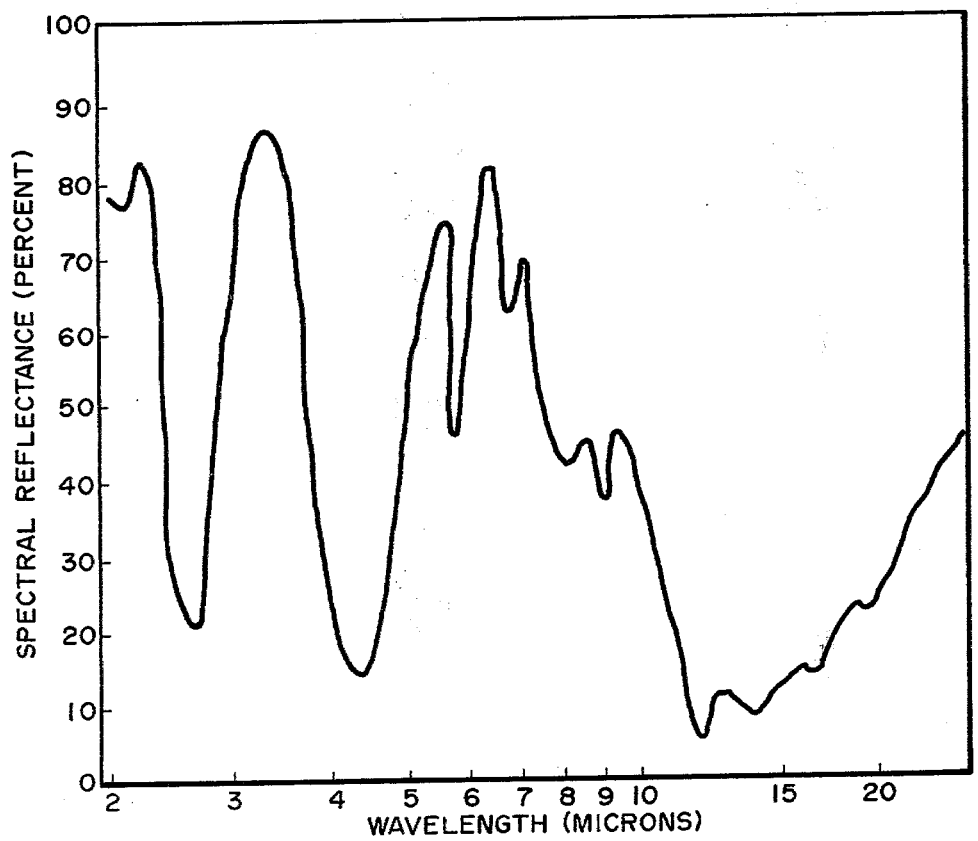
FIG. 4 is a tracing showing the spectral sensitivity of the film of Example 4 when illuminated from the chromium side.

The absorptive coating is selected based on spectral sensitivity and optimum absorptivity, e.g. chromium or indium tin oxide (FIG. 4). The coatings can be from 50 Å to 1000 Å. A chromium coating having a thickness from about 100–150 Å appears optimum since at lower thicknesses, the coating is not continuous and at higher thicknesses, the film coating becomes too thick for optimum absorbance. Transduction response appears to be further improved by coating the rear face of the film with a high specular reflectance layer such as a 500 Å to 5000 Å thick aluminum film. The optimum thickness for aluminum is about 1000 Å.

Figure 1:
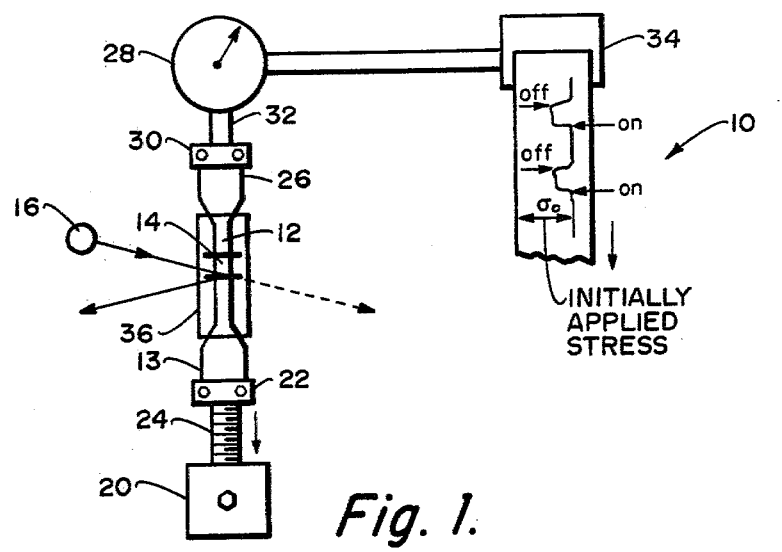
FIG. 1 is a schematic view of a transducer system in accordance with this invention.

Referring now to FIG. 1, the transducer system 10 is seen to comprise the rectangular test strip 12 having its absorptive face 14 mounted toward illumination source 16. One end 13 of the strip 12 is attached to the movable support 20 by means of clamp 22 and screw 24. The other end 26 is attached to the strain gage 28 by means of clamp 30 and lead 32. The strain gage is connected to chart recorder 34 which contains the typical amplification and graphic instrumentation. A mask 36 is placed across the strip to provide a controlled illumination area.

Figure 2:
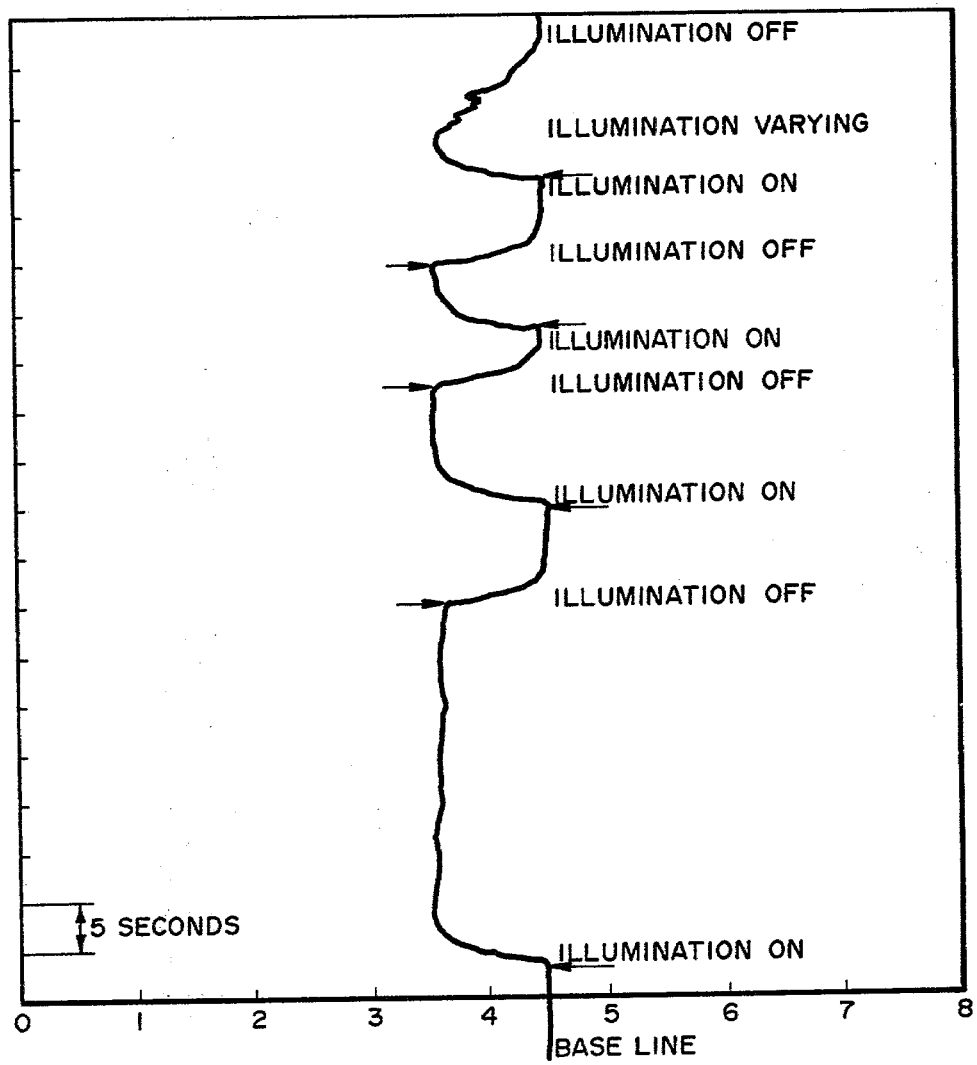
FIG. 2 is a typical strip chart recording of the response of the system of FIG. 1 to variation in illumination.

The system is utilized by clamping the strip 12 between clamps 22, 30 and adjusting screw 24 to apply a fixed, unidirectional strain to the strip. The mask 36 is placed near the face of the sample and the light source 16 is switched on. As seen in FIG. 2, the effect of illumination was a typical square wave drop in measured stress followed by an immediate return to the applied stress as soon as the illumination source was removed. The recorder was arranged to provide continuous stress values with time. When the intensity of the artificial light source was varied with time, the measured mechanical stress was also time dependent. Total light exposure can be determined by graphical integration of the area under the trace of the varying mechanical stress.

In initial experiments conducted on an Instron machine with a 2.5 μm (0.1 mil) thick Kapton (aromatic polyimide) film having a 125 Å chromium coating on the front side and a 1000 Å aluminum film on the back side, the load decreased by 10% to 20% when the chromium side of the film was illuminated. Illumination of the aluminum side of the film showed an analogous response but much lower, on the order of 20% of the response of the chromium side. When blue, green and orange filters were placed in front of the mask the response increased in the order blue>green>orange.

Several commercially available polymers of vastly different structures and properties were studied. These are: Kapton, a polyimide (DuPont); Mylar, a polyester (DuPont); B100, a polyimide (Ciba-Geigy) and an ordinary household utility bag made from carbon-black filled polyethylene. In some instances, the specimens were metallized with chromium and/or aluminum by vapor deposition. The metallization thickness was so chosen that the aluminum coating (1000 Å) would have optimum specular reflectance and the chromium coating (100–125 Å) would have optimum absorbtivity. Some ultrathin specimens (2.5μ) were prepared either by solution casting or by chemical or plasma etching of the commercially available thicker films. It might also be noted that ordinary household aluminum wrap (40 μm thick), when illuminated from its more reflective side, also showed a photoresponse which proves the universality of the phenomenon.

In a typical experiment, a strip of film 8 cm ×3 cm was clamped at each end in an Instron test machine equipped with a 200 gram load cell. An initial load of about 50 grams was applied to the film; the strain corresponding to this load was then fixed by stopping the crosshead. The load at the fixed strain was then recorded as a function of time. These loads were chosen so that no appreciable stress relaxation would occur in the absence of the illumination. The light source was an ordinary microscope stage illuminator (tungsten wire bulb with a collimator). Using a mask, 1 cm of the central portion of the film was illuminated (3 cm$^2$). The same phenomenon, although of lower magnitude, was also observed when an ordinary flashlight was used as the light source. FIG. 2 shows a typical chart recording of the phenomenon.

Figure 3:
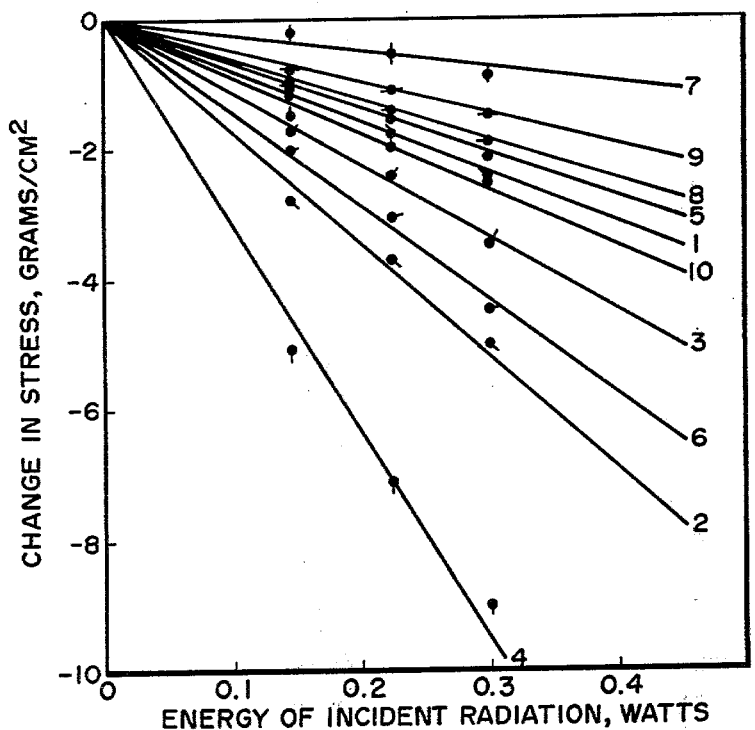
FIG. 3 is a series of curves showing the steady state stress response of several ultrathin films in response to the energy of the incident radiation, each curve being numbered to correspond to the Examples in Table 1.

The data obtained are shown in FIG. 3 where the steady state change in stress is plotted as a function of the intensity of the incident radiation for several of the materials studied. As may be seen, the response is linear—the greater the intensity of the incident radiation, the greater is the change in stress. Table I lists the slope for each of the curves shown in the figure as well as the nature of the surface being illuminated. All material tested including a bare aluminum film showed some response; however, the ultrathin Kapton film having coatings of aluminum on one side and chromium on the other and illuminated on the chromium side showed the greatest response so far observed. Films have been taken through many cycles of illumination without evidence of a diminution of the response.

TABLE I

| Example | Material | Polymer Film Thickness μm | Coating Side 1 | and Side 2 | Illuminated Side | Response gm/cm$^2$ watt |
|---|---|---|---|---|---|---|
| 1 | Kapton | 2.5 | None | None | Kapton | −4.0 |
| 2 | Kapton | 2.5 | Chromium | None | Kapton | −8.4 |
| 3 | Kapton | 2.5 | Chromium | None | Chromium | −5.5 |
| 4 | Kapton | 2.5 | Chromium | Aluminum | Chromium | −16 |
| 5 | Kapton | 2.5 | Chromium | Aluminum | Aluminum | −3.6 |
| 6 | B100 | 3.5 | Aluminum | None | B100 | −7 |
| 7 | B100 | 3.5 | Aluminum | None | Aluminum | −1.5 |
| 8 | Mylar | 12.5 | Aluminum | None | Mylar | −3.3 |
| 9 | Mylar | 12.5 | Aluminum | None | Aluminum | −2.5 |
| 10 | Polyethylene* | 40 | None | None | Polyethylene | −4.4 |

*Carbon black filled

It is believed that the effects described above, are produced by a reversible and rapid heating of the specimen induced by the absorption of the incident radiation. An approximate analysis of this effect may be based on Hook's Law as follows: For small strains one may write:

$$\sigma = E\epsilon \quad (1)$$

Where $\sigma$ is the stress, E is the Young's modulus and $\epsilon$ is the strain. Assuming that both E and $\epsilon$ vary due to temperature changes broght about by the parital absorption of incident radiation, the resulting change in the stress may be written as:

$$\Delta\sigma = -[E(1+\epsilon)\alpha + \frac{\sigma\delta}{1-\delta T}]\Delta T \quad (2)$$

where $\epsilon$ and $\alpha$ are the thermal coefficients of the modulus and specimen length respectively and $\Delta T$ is the change in temperature. At the steady state $$\Delta T = kQ/C_p \quad (3)$$

where k is an absorption coefficient of the film, (a function of wavelength, polymer structure and the nature of the illuminated surface) Q is the energy density of the incident radiation, and $C_p$ is the heat capacity of the film. Combining equation (2) and (3) yields:

$$\Delta\sigma = -[(1+\epsilon)\alpha + \frac{\sigma\delta}{1-\delta T}]\frac{kQ}{C_p} \quad (4)$$

Equation (4) predicts that for fixed values of the initial stress and strain, the change in stress is a linear function of the incident radiation which is in agreement with experiment (FIG. 2). Since generally $\alpha > \beta$, then for small values of the stress (and strain) the equation simplifies to:

$$\Delta\sigma = -E\alpha kQ/C_p \quad (5)$$

This expression indicates that a high response is produced when E, $\alpha$, k, are large and $C_p$ is small in magnitude, which explains why this phenomenon has never been recorded before and also why the ultrathin Kapton film coated with chromium and aluminum and illuminated from chromium side (high absorptivity) is the best transducer so far found.

An approximate analysis of the transient response can be based on the assumption that the rate of the temperature change is proportional to the temperature between the thin specimen and its surroundings. This yields the following result:

$$\frac{\sigma(t) - \sigma_1}{\sigma_2 - \sigma_1} = e^{-\beta t} \quad (6)$$

where $\sigma(t)$ is the value of the stress in the time dependent region, $\sigma_1$ is the initial steady state stress, $\sigma_2$ is the final steady state stress and $\beta$ is a constant. It was found that $\beta$ for the metalized Kapton specimens had a value of 0.67 sec$^{-1}$. This same value was obtained on both heating and cooling.

It is to be realized that only preferred embodiments of the invention have been described and that numerous substitutions, modifications and alterations are permissible without departing from the spirit and scope of the invention as defined in the following claims.

What is claimed is:

1. A photomechanical transducer comprising in combination:
   an ultrathin strip of a metal or a polymer film having a high glass transition temperature and first and second ends and said strip having a thickness below 75 $\mu$m, a low creep rate, a high elastic modulus, high thermal expansion coefficient, low heat capacity and a very highly efficient light absorptive surface;
   means mounting said surface of the strip in the path of a light illumination source including a first fixed clamping means and a second moveable clamping means for clamping said first and second ends;
   means for applying a small constant strain to the strip attached to the second moveable clamping means; and
   strain measuring means connected to the moveable clamping means for measuring dimensional changes in said strip in response to light absorption of said surface from the illumination source.

2. A transducer according to claim 3 in which the thickness is from 10 Å to 75 $\mu$m.

3. A transducer according to claim 2 in which the ultrathin film is a metal or a natural or a synthetic polymer containing a radiation absorbing pigment.

4. A transducer according to claim 3 in which the pigment is coated onto a surface of the film.

5. A transducer according to claim 4 in which the plastic is selected from polyimides, polyesters, polyolefins, polyamides or polycarbonates.

6. A transducer according to claim 5 in which the absorptive coating has a thickness from 50 Å to 1000 Å.

7. A transducer according to claim 6 in which the surface of the film from opposite the illumination source includes a coating of a highly reflective substance having a thickness from 500 Å to 5000 Å.

8. A transducer according to claim 7 in which the film is an aromatic polyimide, the absorptive coating is a 100–150 Å thick chromium film and the reflective coating is about 1000 Å thick aluminum.

9. A method of detecting illumination comprising the steps of:
   interposing a photomechanical transducer as defined in claim 1 in the path of the illumination;
   absorbing radiation from the illumination; and
   measuring the dimensional change of the film in response to changes in illumination.

10. A method according to claim 9 in which a fixed strain is applied to the transducer and change of strain of the transducer is measured.

11. A method of converting light to mechanical energy comprising the steps of:
    interposing a photomechanical transducer as defined in claim 1 in the path of the light;
    absorbing radiation from the light;
    dimensionally changing the transducer in response to the light; and
    connecting the transducer to a moveable element.

12. A transducer according to claim 6 in which the absorptive coating is selected from chromium, indium, or tin oxide.

13. A transducer according to claim 2 in which the film is a linear synthetic polymer film, the absorptive surface comprises a coating of a light absorptive pigment and said film contains a rear surface having a high specular reflectance coating.

* * * * *